United States Patent
Chen et al.

(10) Patent No.: US 12,313,147 B2
(45) Date of Patent: *May 27, 2025

(54) HERRINGBONE PLANETARY GEAR TRANSMISSION DEVICE WITH CONSTANT MESHING CHARACTERISTICS CONSTRUCTED TOOTH PAIR

(71) Applicants: Chongqing University, Chongqing (CN); Chongqing Yisilun Technology Co., Ltd., Chongqing (CN)

(72) Inventors: Bingkui Chen, Chongqing (CN); Chao Tian, Chongqing (CN); Luhe Zhang, Chongqing (CN); Changyan Peng, Chongqing (CN); Wenjun Luo, Chongqing (CN); Chaoyang Li, Chongqing (CN); Yonghong Chen, Chongqing (CN)

(73) Assignees: Chongqing University, Chongqing (CN); Chongqing Yisilun Technology Co., Ltd., Chongqing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,948

(22) Filed: May 8, 2024

(65) Prior Publication Data
US 2024/0401673 A1 Dec. 5, 2024

(30) Foreign Application Priority Data
May 31, 2023 (CN) .......................... 202310632426.8

(51) Int. Cl.
*F16H 55/08* (2006.01)
*F16H 1/34* (2006.01)

(52) U.S. Cl.
CPC ............... *F16H 1/34* (2013.01); *F16H 55/08* (2013.01); *F16H 2055/0893* (2013.01)

(58) Field of Classification Search
CPC .... F16H 1/34; F16H 55/08; F16H 2055/0893; F16H 2055/086; F16H 55/0806
(Continued)

(56) References Cited

U.S. PATENT DOCUMENTS 6,101,892 A * 8/2000 Berlinger, Jr. ...... F16H 55/0826
74/462
9,291,248 B2 * 3/2016 Mittermair .............. F16H 55/06
(Continued)

FOREIGN PATENT DOCUMENTS

CN 105114542 A 12/2015
WO WO-2006038901 A1 * 4/2006 ............... F16H 1/32

*Primary Examiner* — Roger L Pang
(74) *Attorney, Agent, or Firm* — CM Law PLLC; Robert C. Klinger

(57) ABSTRACT

Provided is a herringbone planetary gear transmission device with a constant meshing characteristics constructed tooth pair, which relates to the technical field of gear transmission. The transmission device includes a sun gear with a constructed tooth pair, a planetary gear with a constructed tooth pair and an internal gear with a constructed tooth pair based on conjugate curves. Normal tooth profiles of the gears with a constructed tooth pair in the present disclosure are all the same combined curve and can be machined by using the same cutter. A common normal at an inflection point or a tangent point of the curve passes through a pitch point of a meshing gear pair, and a sliding ratio of the meshing gear pair is adjusted according to an adjusted position of the inflection point or the tangent point. A contact ratio of the meshing gear pair is designed as an integer.

9 Claims, 6 Drawing Sheets

(58) Field of Classification Search
USPC .......................................................... 475/344
See application file for complete search history.

(56) References Cited

U.S. PATENT DOCUMENTS

| | | | |
|---|---|---|---|
| 2009/0062058 A1* | 3/2009 | Kimes ........................ | F16H 1/28 |
| | | | 475/344 |
| 2024/0401684 A1* | 12/2024 | Chen ........................ | F16H 55/08 |
| 2024/0401685 A1* | 12/2024 | Zhang ........................ | F16H 1/24 |
| 2024/0401686 A1* | 12/2024 | Chen ........................ | F16H 55/088 |

* cited by examiner

HERRINGBONE PLANETARY GEAR TRANSMISSION DEVICE WITH CONSTANT MESHING CHARACTERISTICS CONSTRUCTED TOOTH PAIR

CROSS REFERENCE TO RELATED APPLICATION

This patent application claims the benefit and priority of Chinese Patent Application No. 202310632426.8, filed with the China National Intellectual Property Administration on May 31, 2023, the disclosure of which is incorporated by reference herein in its entirety as part of the present application.

TECHNICAL FIELD

The present disclosure relates to the technical field of gear transmission, and in particular, to a herringbone planetary gear transmission device with a constant meshing characteristics constructed tooth pair.

BACKGROUND

For planetary gear transmission, external meshing between a sun gear and a plurality of planetary gears and internal meshing between an internal gear and the plurality of planetary gears are often used, and the plurality of planetary gears participate in meshing to share a load and achieve power splitting. Compared with an ordinary gear transmission system, planetary gear transmission has the advantages of compact structure, strong bearing capacity, high power density, large transmission ratio, steady transmission, and the like, and is widely used in fields of aerospace, vehicles and vessels, wind power generation, engineering machinery, and the like.

The patent No. CN 105114542 A discloses a planetary gear transmission device based on a herringbone gear with conjugate curves. A gear pair constructed in the above patent includes a convex-tooth gear and a concave-tooth gear, and a pair of gears with concave and convex tooth profiles in the gear pair needs machining by means of different cutters, which increases a manufacturing cost of the gear pair. The concave and convex tooth profiles lead to a limited curvature radius at a meshing point of the gear pair, thereby limiting further improvement of the bearing capacity of the gear pair. With regard to selection of a contact point, tooth surface interference occurs at a pitch point, making it difficult to achieve a zero sliding ratio. During meshing, the contact point moves in a tooth width direction, which leads to a time-varying meshing force. Therefore, there is an urgent need to innovate a tooth profile design based on an existing design theory of gears with spatial conjugate curves, so as to improve meshing performance of a meshing gear pair of a planetary gear transmission device with a constructed tooth pair and reduce a production and manufacturing cost of the planetary gear transmission device with a constructed tooth pair.

SUMMARY

In view of this, the present disclosure provides a herringbone planetary gear transmission device with a constant meshing characteristics constructed tooth pair. In the planetary gear transmission device, a sun gear with a constructed tooth pair, a planetary gear with a constructed tooth pair and an internal gear with a constructed tooth pair have the same normal tooth profile, with a constant curvature radius at a meshing point that tends to infinity, a constant sliding ratio and a constant direction of a meshing force action line, and the transmission device technically features low manufacturing cost, high bearing capacity, high transmission efficiency, low vibration and noise, and the like.

A herringbone planetary gear transmission device with a constant meshing characteristics constructed tooth pair disclosed in the present disclosure includes a sun gear with a constructed tooth pair, a planetary gear with a constructed tooth pair and an internal gear with a constructed tooth pair based on conjugate curves, where a normal tooth profile curve $\Gamma_{s1}$ of the sun gear with a constructed tooth pair, a normal tooth profile curve $\Gamma_{s2}$ of the planetary gear with a constructed tooth pair and a normal tooth profile curve $\Gamma_{s3}$ of the internal gear with a constructed tooth pair are continuous combined curves $\Gamma_L$ with the same curve shape, and the continuous combined curves $\Gamma_L$ include a combined curve $\Gamma_{L1}$ of an odd power function curve and a tangent at an inflection point thereof, a combined curve $\Gamma_{L2}$ of a sine function curve and a tangent at an inflection point thereof, a combined curve $\Gamma_{L3}$ of an epicycloid function curve and a tangent at an inflection point thereof, a combined curve $\Gamma_{L4}$ of an odd power function, a combined curve $\Gamma_{L5}$ of a sine function, or a combined curve $\Gamma_{L6}$ of an epicycloid function; the continuous combined curve is formed by two continuous curves, a connection point of the two continuous curves is an inflection point or a tangent point of the continuous combined curve, and the inflection point or the tangent point of the continuous combined curve is a designated point located on a meshing force action line of a gear pair; and normal tooth profiles are swept along given conjugate curves to obtain tooth surfaces of the sun gear with a constructed tooth pair, the planetary gear with a constructed tooth pair and the internal gear with a constructed tooth pair.

Further, in the herringbone planetary gear transmission device with a constant meshing characteristics constructed tooth pair, when the continuous combined curve $\Gamma_L$ is the combined curve $\Gamma_{L1}$ of the odd power function curve and the tangent at the inflection point thereof, the continuous combined curve $\Gamma_L$ is formed by an odd power function curve $\Gamma_{L12}$ and a tangent $\Gamma_{L11}$ at an inflection point of the odd power function curve; a rectangular coordinate system is established at the tangent point of the continuous combined curve, and an equation of the combined curve $\Gamma_{L1}$ of the odd power function curve and the tangent at the inflection point thereof is as follows:

$$\begin{cases} \Gamma_{L11}: x_{10} = t,\ y_{10} = 0\ (t_1 \le t < 0) \\ \Gamma_{L12}: x_{10} = t,\ y_{10} = At^{2n-1}(0 \le t \le t_2) \end{cases},$$

where $x_{10}$ and $y_{10}$ are x-axis and y-axis coordinate values of the combined curve in the rectangular coordinate system, respectively; a parameter t is an independent variable of the equation; $t_1$ and $t_2$ are value ranges of the continuous curve; A is a coefficient of the equation; and n is a degree of the independent variable and is a positive integer.

Further, in the herringbone planetary gear transmission device with a constant meshing characteristics constructed tooth pair, when the continuous combined curve $\Gamma_L$ is the combined curve $\Gamma_{L2}$ of the sine function curve and the tangent at the inflection point thereof, the continuous combined curve $\Gamma_L$ is formed by a sine function curve $\Gamma_{L22}$ and a tangent $\Gamma_{L21}$ at an inflection point of the sine function curve; a rectangular coordinate system is established at the tangent point of the continuous combined curve, and an equation of the combined curve $\Gamma_{L2}$ of the sine function curve and the tangent at the inflection point thereof is as follows:

$$\begin{cases} \Gamma_{L21}: x_{20} = t, y_{20} = kt & (t_1 \le t < 0) \\ \Gamma_{L22}: x_{20} = t, y_{20} = A\sin(Bt) & (0 \le t \le t_2) \end{cases},$$

where $x_{20}$ and $y_{20}$ are x-axis and y-axis coordinate values of the combined curve in the rectangular coordinate system, respectively; a parameter t is an independent variable of the equation; $t_1$ and $t_2$ are value ranges of the continuous curve; k is a slope of the tangent at the inflection point of the sine function curve; and A and B are coefficients of the equation.

Further, in the herringbone planetary gear transmission device with a constant meshing characteristics constructed tooth pair, when the continuous combined curve $\Gamma_L$ is the combined curve $\Gamma_{L3}$ of the epicycloid function curve and the tangent at the inflection point thereof, the continuous combined curve $\Gamma_L$ is formed by an epicycloid function curve $\Gamma_{L32}$ and a tangent $\Gamma_{L31}$ at an inflection point of the epicycloid function curve; a rectangular coordinate system is established at the tangent point of the continuous combined curve, and an equation of the combined curve $\Gamma_{L3}$ of the epicycloid function curve and the tangent at the inflection point thereof is as follows:

$$\begin{cases} \Gamma_{L31}: x_{30} = t, y_{30} = kt & (t_1 \le t < 0) \\ \Gamma_{L32}: \\ x_{30} = (R+r)\sin t - e\sin((R+r)t/r) & (0 \le t < t_2) \\ y_{30} = (R+r)\cos t - e\cos((R+r)t/r) - (R+r-e) \end{cases},$$

where $x_{30}$ and $y_{30}$ are x-axis and y-axis coordinate values of the combined curve in the rectangular coordinate system, respectively; a parameter t is an independent variable of the equation; $t_1$ and $t_2$ are value ranges of the continuous curve; k is a slope of the tangent at the inflection point of the epicycloid function curve; R and r are radii of a cycloidal moving circle and fixed circle, respectively; and e is an eccentric distance.

Further, in the herringbone planetary gear transmission device with a constant meshing characteristics constructed tooth pair, when the continuous combined curve $\Gamma_L$ is the combined curve $\Gamma_{L4}$ of the odd power function, the continuous combined curve $\Gamma_L$ is formed by a first odd power function curve $\Gamma_{L41}$ and a second odd power function curve $\Gamma_{L42}$; a rectangular coordinate system is established at the inflection point of the continuous combined curve, and an equation of the combined curve $\Gamma_{L4}$ of the odd power function is as follows:

$$\begin{cases} \Gamma_{L41}: x_{40} = t, y_{40} = At^{2n1-1} & (t_1 \le t < 0) \\ \Gamma_{L42}: x_{40} = t, y_{40} = Bt^{2n2-1} & (0 \le t < t_2) \end{cases},$$

where $x_{40}$ and $y_{40}$ are x-axis and y-axis coordinate values of the combined curve in the rectangular coordinate system, respectively; a parameter t is an independent variable of the equation; $t_1$ and $t_2$ are value ranges of the continuous curve; A and B are coefficients of the equation; and n1 and n2 are degrees of the independent variable and are positive integers.

Further, in the herringbone planetary gear transmission device with a constant meshing characteristics constructed tooth pair, when the continuous combined curve $\Gamma_L$ is the combined curve $\Gamma_{L5}$ of the sine function, the continuous combined curve $\Gamma_L$ is formed by a first sine function curve $\Gamma_{L51}$ and a second sine function curve $\Gamma_{L52}$; a rectangular coordinate system is established at the inflection point of the continuous combined curve, and an equation of the combined curve $\Gamma_{L5}$ of the sine function is as follows:

$$\begin{cases} \Gamma_{L51}: x_{50} = t, y_{50} = A_1\sin(B_1 t) & (t_1 \le t < 0) \\ \Gamma_{L52}: x_{50} = t, y_{50} = A_2\sin(B_2 t) & (0 \le t < t_2) \end{cases},$$

where $x_{50}$ and $y_{50}$ are x-axis and y-axis coordinate values of the combined curve in the rectangular coordinate system, respectively; a parameter t is an independent variable of the equation; $t_1$ and $t_2$ are value ranges of the continuous curve; and $A_1$, $B_1$, $A_2$ and $B_2$ are coefficients of the equation.

Further, in the herringbone planetary gear transmission device with a constant meshing characteristics constructed tooth pair, when the continuous combined curve $\Gamma_L$ is the combined curve $\Gamma_{L6}$ of the epicycloid function, the continuous combined curve $\Gamma_L$ is formed by a first epicycloid function curve $\Gamma_{L61}$ and a second epicycloid function curve $\Gamma_{L62}$; a rectangular coordinate system is established at the inflection point of the continuous combined curve, and an equation of the combined curve $\Gamma_{L6}$ of the epicycloid function is as follows:

$$\begin{cases} \Gamma_{L61}: \\ x_{60} = -(R_1+r_1)\sin t + e\sin((R_1+r_1)t/r_1) & (t_1 \le t < 0) \\ y_{60} = -(R_1+r_1)\cos t + e\cos((R_1+r_1)t/r_1) - (R_1+r_1-e) \\ \Gamma_{L62}: \\ x_{60} = (R_2+r_2)\sin t - e\sin((R_2+r_2)t/r_2) & (0 \le t < t_2) \\ y_{60} = (R_2+r_2)\cos t - e\cos((R_2+r_2)t/r_2) - (R_2+r_2-e) \end{cases},$$

where $x_{60}$ and $y_{60}$ are x-axis and y-axis coordinate values of the combined curve in the rectangular coordinate system, respectively; a parameter t is an independent variable of the equation; $t_1$ and $t_2$ are value ranges of the continuous curve; $R_1$ and $r_1$ are radii of a first epicycloid moving circle and fixed circle, respectively, and $R_2$ and $r_2$ are radii of a second epicycloid moving circle and fixed circle, respectively; and e is an eccentric distance.

Further, in the herringbone planetary gear transmission device with a constant meshing characteristics constructed tooth pair, a curve equation of the normal tooth profile curve $\Gamma_{s1}$ of the sun gear with a constructed tooth pair obtained by rotating the continuous combined curve $\Gamma_L$ around an origin of the rectangular coordinate system by an angle $\alpha_1$ is as follows:

$$\begin{cases} x_{01} = x_{n0}\cos\alpha_1 - y_{n0}\sin\alpha_1 \\ y_{01} = x_{n0}\sin\alpha_1 + y_{n0}\cos\alpha_1 \end{cases} (n = 1, 2, 3, 4, 5, 6),$$

where $x_{01}$ and $y_{01}$ are x-axis and y-axis coordinate values of the normal tooth profile curve of the sun gear with a constructed tooth pair in the rectangular coordinate system, respectively.

Further, in the herringbone planetary gear transmission device with a constant meshing characteristics constructed tooth pair, a curve equation of the normal tooth profile curve $\Gamma_{s2}$ of the planetary gear with a constructed tooth pair obtained by rotating the normal tooth profile curve $\Gamma_{s1}$ of the sun gear with a constructed tooth pair around the origin of the rectangular coordinate system by an angle of 180° is as follows:

$$\begin{cases} x_{02} = x_{01}\cos(180°) - y_{01}\sin(180°) \\ y_{02} = x_{01}\sin(180°) + y_{01}\cos(180°) \end{cases},$$

where $x_{02}$ and $y_{02}$ are x-axis and y-axis coordinate values of the normal tooth profile curve of the planetary gear with a constructed tooth pair in the rectangular coordinate system, respectively.

Further, in the herringbone planetary gear transmission device with a constant meshing characteristics constructed tooth pair, a curve equation of the normal tooth profile curve $\Gamma_{s3}$ of the internal gear with a constructed tooth pair obtained by rotating the normal tooth profile curve $\Gamma_{s2}$ of the planetary gear with a constructed tooth pair around the origin of the rectangular coordinate system by an angle of 180° is as follows:

$$\begin{cases} x_{03} = x_{02}\cos(180°) - y_{02}\sin(180°) \\ y_{03} = x_{02}\sin(180°) + y_{02}\cos(180°) \end{cases},$$

where $x_{03}$ and $y_{03}$ are x-axis and y-axis coordinate values of the normal tooth profile curve of the internal gear with a constructed tooth pair in the rectangular coordinate system, respectively.

Further, in the herringbone planetary gear transmission device with a constant meshing characteristics constructed tooth pair, a tooth surface $\Sigma_1$ of the sun gear with a constructed tooth pair is obtained by sweeping the normal tooth profile curve $\Gamma_{s1}$ of the sun gear with a constructed tooth pair along a given helix, with a tooth surface equation as follows:

$$\begin{cases} x_{\Sigma 1} = x_{01}\cos\theta - y_{01}\cos\beta\sin\theta + r_1\cos\theta \\ y_{\Sigma 1} = x_{01}\sin\theta + y_{01}\cos\beta\cos\theta + r_1\sin\theta \\ z_{\Sigma 1} = \pm(r_1\theta\cot\beta - y_{01}\sin\beta) \end{cases}$$

where in the sign "±", the sign "+" indicates a left tooth surface, and the sign "−" indicates a right tooth surface; $x_{\Sigma 1}$, $y_{\Sigma 1}$ and $z_{\Sigma 1}$ are coordinate values of the tooth surface of the sun gear with a constructed tooth pair, respectively; $\beta$ is a helix angle of the gear pair, $\theta$ is an angle of a given contact line, and $r_1$ is a pitch radius of the sun gear with a constructed tooth pair.

Further, in the herringbone planetary gear transmission device with a constant meshing characteristics constructed tooth pair, a tooth surface $\Sigma_2$ of the planetary gear with a constructed tooth pair is obtained by sweeping the normal tooth profile curve $\Gamma_{s2}$ of the planetary gear with a constructed tooth pair along a given helix, with a tooth surface equation as follows:

$$\begin{cases} x_{\Sigma 2} = x_{02}\cos\theta - y_{02}\cos\beta\sin\theta + r_2\cos\theta \\ y_{\Sigma 2} = x_{02}\sin\theta + y_{02}\cos\beta\cos\theta + r_2\sin\theta \\ z_{\Sigma 2} = \pm(r_2\theta\cot\beta - y_{02}\sin\beta) \end{cases}$$

where in the sign "±", the sign "+" indicates a left tooth surface, and the sign "−" indicates a right tooth surface; $x_{\Sigma 2}$, $y_{\Sigma 2}$ and $z_{\Sigma 2}$ are coordinate values of the tooth surface of the planetary gear with a constructed tooth pair, respectively; $\beta$ is a helix angle of the gear pair, $\theta$ is an angle of a given contact line, and $r_2$ is a pitch radius of the planetary gear with a constructed tooth pair.

Further, in the herringbone planetary gear transmission device with a constant meshing characteristics constructed tooth pair, a tooth surface $\Sigma_3$ of the internal gear with a constructed tooth pair is obtained by sweeping the normal tooth profile curve $\Gamma_{s3}$ of the internal gear with a constructed tooth pair along a given helix, with a tooth surface equation as follows:

$$\begin{cases} x_{\Sigma 3} = x_{03}\cos\theta - y_{03}\cos\beta\sin\theta + r_3\cos\theta \\ y_{\Sigma 3} = x_{03}\sin\theta + y_{03}\cos\beta\cos\theta + r_3\sin\theta \\ z_{\Sigma 3} = \pm(r_3\theta\cot\beta - y_{03}\sin\beta) \end{cases}$$

where in the sign "±", the sign "+" indicates a left tooth surface, and the sign "−" indicates a right tooth surface; $x_{\Sigma 3}$, $y_{\Sigma 3}$ and $z_{\Sigma 3}$ are coordinate values of the tooth surface of the internal gear with a constructed tooth pair, respectively; $\beta$ is a helix angle of the gear pair, $\theta$ is an angle of a given contact line, and $r_3$ is a pitch radius of the internal gear with a constructed tooth pair.

Further, in the herringbone planetary gear transmission device with a constant meshing characteristics constructed tooth pair, a contact ratio of a meshing gear pair with a constructed tooth pair is designed as an integer, thereby achieving meshing transmission with a constant stiffness.

Further, in the herringbone planetary gear transmission device with a constant meshing characteristics constructed tooth pair, the sun gear with a constructed tooth pair, the planetary gear with a constructed tooth pair and the internal gear with a constructed tooth pair each are designed in the form of a herringbone gear, thereby achieving a constant meshing force action line.

Compared with the prior art, the present disclosure has the following beneficial effects: A sun gear with a constructed tooth pair, a planetary gear with a constructed tooth pair and an internal gear with a constructed tooth pair in the present disclosure have the same normal tooth profile, and can be machined by using the same cutter, thus reducing a manufacturing cost. A curvature radius at a meshing point is constant and tends to infinity, which improves the bearing capacity of a gear pair. A sliding ratio during meshing is constant and may be designed as a zero sliding ratio, which improves transmission efficiency of the gear pair and reduces wear during transmission. The sun gear with a constructed tooth pair, the planetary gear with a constructed tooth pair and the internal gear with a constructed tooth pair each are in the form of a herringbone gear, thereby achieving a constant meshing force action line. A contact ratio of the meshing gear pair is designed as an integer, which can achieve a constant meshing stiffness, thus greatly reducing vibration noise of the gear pair.

BRIEF DESCRIPTION OF THE DRAWINGS

To more clearly describe the technical solutions of the embodiments of the present disclosure, the accompanying drawings required in the embodiments are described briefly below. It should be understood that the following accompanying drawings illustrate only some embodiments of the present disclosure and therefore should not be construed as a limitation on the scope thereof. For those of ordinary skill

DESCRIPTION OF REFERENCE SIGNS

1—Sun gear with a constructed tooth pair, 2—Planetary gear with a constructed tooth pair, 3—Internal gear with a constructed tooth pair.

DETAILED DESCRIPTION OF THE EMBODIMENTS

The present disclosure will be further described in detail below with reference to FIGS. 1 to 8.

In a herringbone planetary gear transmission device with a constant meshing characteristics constructed tooth pair disclosed in the present disclosure, as shown in FIGS. 1 to 8, normal tooth profile curves of a sun gear 1 with a constructed tooth pair, a planetary gear 2 with a constructed tooth pair and an internal gear 3 with a constructed tooth pair are continuous combined curves with the same curve shape, and each meshing point of the sun gear 1 with a constructed tooth pair, the planetary gear 2 with a constructed tooth pair and the internal gear 3 with a constructed tooth pair is at an inflection point or a tangent point of the continuous combined curve.

In the embodiment of the present disclosure, basic parameters of the herringbone planetary gear transmission device with a constant meshing characteristics constructed tooth pair are as follows: Module m=8, number of teeth of the sun gear 1 with a constructed tooth pair: $z_1$=20, number of teeth of the planetary gear 2 with a constructed tooth pair: $z_2$=31, number of teeth of the internal gear 3 with a constructed tooth pair: $z_3$=82, addendum coefficient $h_a^*$=0.5, tip clearance coefficient $c^*$=0.2, addendum $h_a$=4 mm, dedendum $h_f$=5.6 mm, helix angle $\beta$=30°, and unilateral tooth width w=50 mm.

Figure 1:
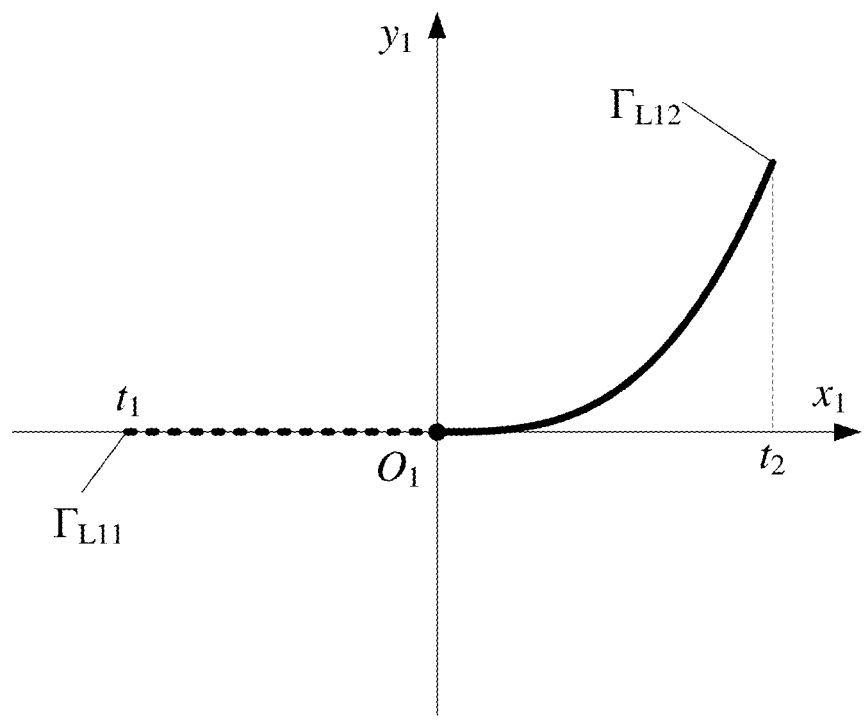
FIG. 1 is a schematic diagram of a combined curve of an odd power function curve and a tangent at an inflection point thereof according to an embodiment of the present disclosure.

With a combined curve of an odd power function curve and a tangent at an inflection point thereof as an example, the combined curve of the odd power function curve and the tangent at the inflection point thereof was drawn in a rectangular coordinate system $\sigma_1$ ($O_1$-$x_1$,$y_1$), as shown in FIG. 1. With a coefficient A=1.2 and n=2, an equation of a combined curve $\Gamma_{L1}$ (formed by an odd power function curve $\Gamma_{L12}$ and a tangent $\Gamma_{L11}$ at an inflection point of the odd power function curve) of an odd power function curve and a tangent at an inflection point thereof is as follows:

$$\begin{cases} \Gamma_{L11}: x_{10} = t, y_{10} = 0 \ (t_1 \le t < 0) \\ \Gamma_{L21}: x_{10} = t, y_{10} = 1.2t^3 \ (0 \le t \le t_2) \end{cases},$$

where $x_{10}$ and $y_{10}$ are x-axis and y-axis coordinate values of the combined curve in the rectangular coordinate system $\sigma_1$, respectively; a parameter t is an independent variable of the equation; and $t_1$ and $t_2$ are value ranges of the continuous curves.

Figure 2:
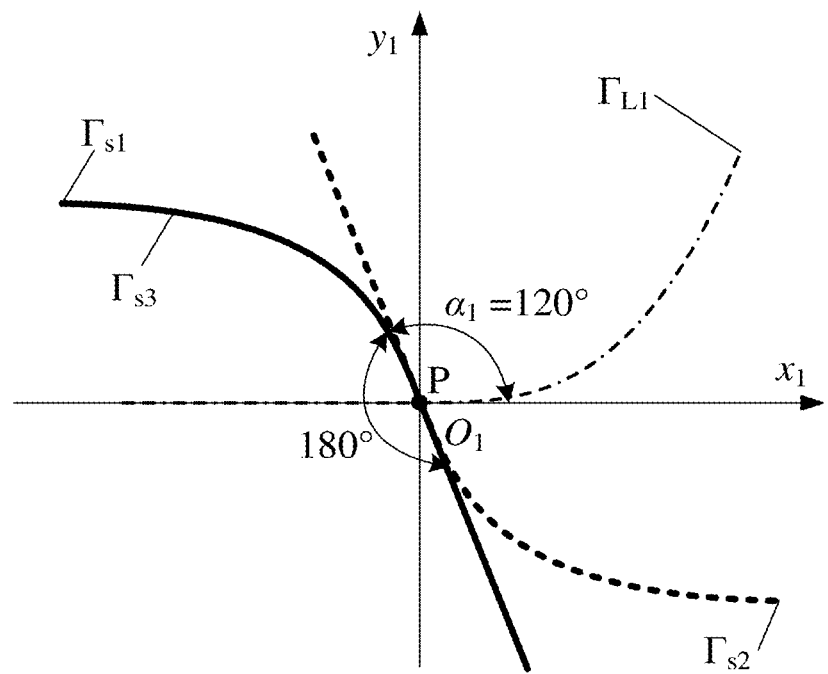
FIG. 2 is a schematic diagram illustrating formation of a normal tooth profile in a herringbone planetary gear transmission device with a constant meshing characteristics constructed tooth pair having a combined curve of an odd power function curve and a tangent at an inflection point thereof as a tooth profile curve according to an embodiment of the present disclosure.

Provided is a schematic diagram illustrating formation of normal tooth profiles of gears with a constructed tooth pair having a combined curve of an odd power function curve and a tangent at an inflection point thereof as a tooth profile curve according to an embodiment of the present disclosure, with an inflection point P being a meshing point, as shown in FIG. 2. In the figure, a tooth root of the sun gear 1 with a constructed tooth pair, a tooth root of the planetary gear 2 with a constructed tooth pair and a tooth root of the internal gear 3 with a constructed tooth pair are tangent segments. The tooth root of the sun gear 1 with a constructed tooth pair, a tooth tip of the planetary gear 2 with a constructed tooth pair and a tooth tip of the internal gear 3 with a constructed tooth pair are cubic power function curve segments. When the continuous combined curve $\Gamma_L$ rotates around an origin of the rectangular coordinate system by an angle $\alpha_1$ to obtain a normal tooth profile curve $\Gamma$s of the sun gear with a constructed tooth pair, the value of the rotation angle $\alpha_1$ needs to be determined according to specific parameters of the gear, with a general value range as follows: 0°<$\alpha_1$<180°. A specific formation process and a tooth profile curve equation of the normal tooth profile of the gear with a constructed tooth pair are as follows:

The combined curve $\Gamma_{L1}$ of the odd power function curve and the tangent at the inflection point thereof rotates around the rectangular coordinate system $\sigma_1$ by an angle of $\alpha_1$=120° to obtain the normal tooth profile curve $\Gamma_{s1}$ of the sun gear 1 with a constructed tooth pair, with a curve equation as follows:

$$\begin{cases} x_{01} = x_{10}\cos(120°) - y_{10}\sin(120°) \\ y_{01} = x_{10}\sin(120°) + y_{10}\cos(120°) \end{cases},$$

where $x_{01}$ and $y_{01}$ are x-axis and y-axis coordinate values of the normal tooth profile curve of the sun gear 1 with a constructed tooth pair in the rectangular coordinate system $\sigma_1$, respectively.

A normal tooth profile curve $\Gamma_{s2}$ of the planetary gear 2 with a constructed tooth pair is obtained by rotating the normal tooth profile curve $\Gamma_{s1}$ of the sun gear 1 with a constructed tooth pair around the origin of the rectangular coordinate system $\sigma_1$ by an angle of 180°, with a curve equation as follows:

$$\begin{cases} x_{02} = x_{01}\cos(180°) - y_{01}\sin(180°) \\ y_{02} = x_{01}\sin(180°) + y_{01}\cos(180°) \end{cases},$$

where $x_{02}$ and $y_{02}$ are x-axis and y-axis coordinate values of the normal tooth profile curve of the planetary gear 2 with a constructed tooth pair in the rectangular coordinate system $\sigma_1$, respectively.

A normal tooth profile curve $\Gamma_{s3}$ of the internal gear 3 with a constructed tooth pair is obtained by rotating the normal tooth profile curve $\Gamma_{s2}$ of the planetary gear 2 with a constructed tooth pair around the origin of the rectangular coordinate system $\sigma_1$ by an angle of 180°, with a curve equation as follows:

$$\begin{cases} x_{03} = x_{02}\cos(180°) - y_{02}\sin(180°) \\ y_{03} = x_{02}\sin(180°) + y_{02}\cos(180°) \end{cases},$$

where $x_{03}$ and $y_{03}$ are x-axis and y-axis coordinate values of the normal tooth profile curve of the internal gear 3 with a constructed tooth pair in the rectangular coordinate system $\sigma_1$, respectively.

Figure 3:
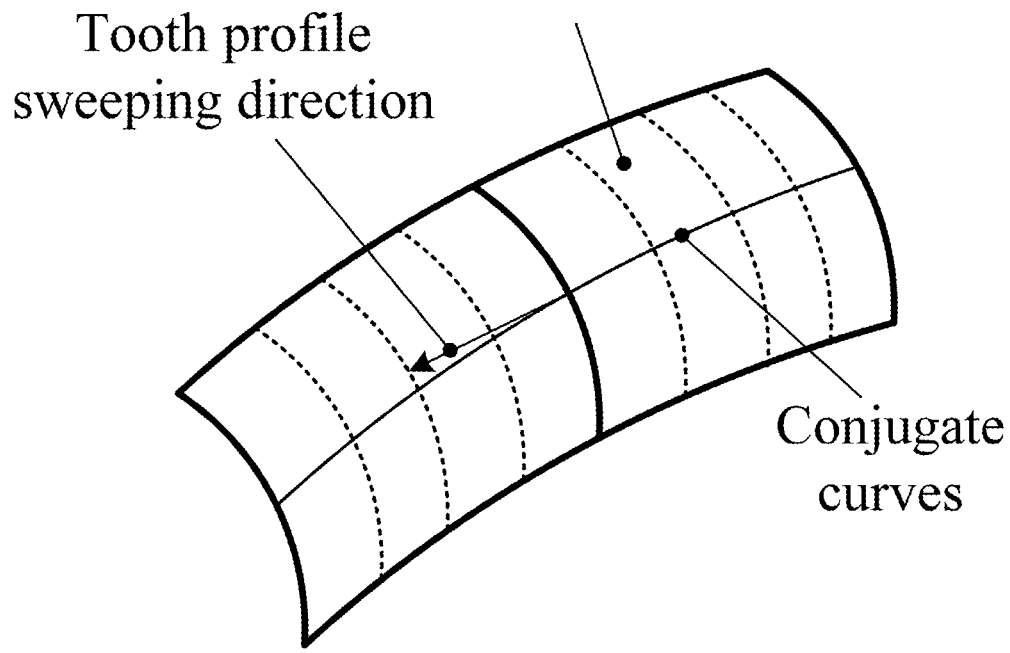
FIG. 3 is a schematic diagram illustrating construction of a gear tooth surface in a herringbone planetary gear transmission device with a constant meshing characteristics constructed tooth pair having a combined curve of an odd power function curve and a tangent at an inflection point thereof as a tooth profile curve according to an embodiment of the present disclosure.

FIG. 3 is a schematic diagram illustrating construction of tooth surfaces of gears with a constructed tooth pair having a combined curve of an odd power function curve and a tangent at an inflection point thereof as a tooth profile curve according to an embodiment of the present disclosure. A specific construction process and a tooth surface equation of the tooth surface of each gear with a constructed tooth pair are as follows:

A tooth surface $\Sigma_1$ of the sun gear 1 with a constructed tooth pair is obtained by sweeping the normal tooth profile curve $\Gamma_{s1}$ of the sun gear 1 with a constructed tooth pair along a given helix, with a tooth surface equation as follows:

$$\begin{cases} x_{\Sigma 1} = x_{01}\cos\theta - y_{01}\cos(30°)\sin\theta + 92.376\cos\theta \\ y_{\Sigma 1} = x_{01}\sin\theta + y_{01}\cos(30°)\cos\theta + 92.376\sin\theta \\ z_{\Sigma 1} = \pm[92.376\theta\cot(30°) - y_{01}\sin(30°)] \end{cases}$$

where in the sign "±", the sign "+" indicates a left tooth surface, and the sign "−" indicates a right tooth surface; and $x_{\Sigma 1}$, $y_{\Sigma 1}$ and $z_{\Sigma 1}$ are coordinate values of the tooth surface of the sun gear 1 with a constructed tooth pair.

Similarly, a tooth surface $\Sigma_2$ of the planetary gear 2 with a constructed tooth pair is obtained by sweeping the normal tooth profile curve $\Gamma_{s2}$ of the planetary gear 2 with a constructed tooth pair along a given helix, with a tooth surface equation as follows:

$$\begin{cases} x_{\Sigma 2} = x_{02}\cos\theta - y_{02}\cos(30°)\sin\theta + 143.183\cos\theta \\ y_{\Sigma 2} = x_{02}\sin\theta + y_{02}\cos(30°)\cos\theta + 143.183\sin\theta \\ z_{\Sigma 2} = \pm[143.183\theta\cot(30°) - y_{02}\sin(30°)] \end{cases}$$

where in the sign "±", the sign "+" indicates a left tooth surface, and the sign "−" indicates a right tooth surface; $x_{\Sigma 2}$, $y_{\Sigma 2}$ and $z_{\Sigma 2}$ are coordinate values of the tooth surface of the planetary gear 2 with a constructed tooth pair; and $\theta$ is an angle of a given contact line.

Similarly, a tooth surface $\Sigma_3$ of the internal gear 3 with a constructed tooth pair is obtained by sweeping the normal tooth profile curve $\Gamma_{s3}$ of the internal gear 3 with a constructed tooth pair along a given helix, with a tooth surface equation as follows:

$$\begin{cases} x_{\Sigma 3} = x_{03}\cos\theta - y_{03}\cos(30°)\sin\theta + 378.742\cos\theta \\ y_{\Sigma 3} = x_{03}\sin\theta + y_{03}\cos(30°)\cos\theta + 378.742\sin\theta \\ z_{\Sigma 3} = \pm[378.742\theta\cot(30°) - y_{02}\sin(30°)] \end{cases}$$

where in the sign "±", the sign "+" indicates a left tooth surface, and the sign "−" indicates a right tooth surface; $x_{\Sigma 3}$, $y_{\Sigma 3}$ and $z_{\Sigma 3}$ are coordinate values of the tooth surface of the internal gear 3 with a constructed tooth pair; and $\theta$ is an angle of a given contact line.

Figure 4:
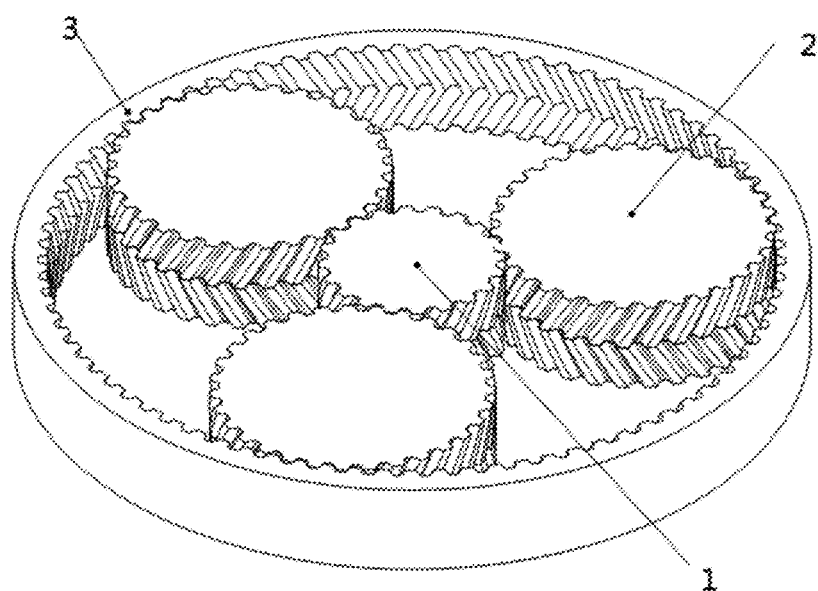
FIG. 4 is a schematic entity diagram of a herringbone planetary gear transmission device with a constant meshing characteristics constructed tooth pair having a combined curve of an odd power function curve and a tangent at an inflection point thereof as a tooth profile curve according to an embodiment of the present disclosure.

FIG. 4 is a schematic entity diagram of a herringbone planetary gear transmission device with a constructed tooth pair having a combined curve of an odd power function curve and a tangent at an inflection point thereof as a tooth profile curve according to an embodiment of the present disclosure. An addendum circle and a dedendum circle are generated by stretching. Trimming, stitching, rounding, and other operations are performed on the tooth surfaces of the sun gear 1 with a constructed tooth pair, the planetary gear 2 with a constructed tooth pair and the internal gear 3 with a constructed tooth pair to obtain a schematic entity diagram of the herringbone planetary gear transmission device with a constructed tooth pair having the same tooth profile of continuous combined curves.

In the embodiment of the present disclosure, the normal tooth profile curves of the sun gear 1 with a constructed tooth pair, the planetary gear 2 with a constructed tooth pair and the internal gear 3 with a constructed tooth pair each may alternatively be a combined curve $\Gamma_{L2}$ of a sine function curve and a tangent at an inflection point thereof, a combined curve $\Gamma_{L3}$ of an epicycloid function curve and a tangent at an inflection point thereof, a combined curve $\Gamma_{L4}$ of an odd power function, a combined curve $\Gamma_{L5}$ of a sine function, or a combined curve $\Gamma_{L6}$ of an epicycloid function, with a curve equation as follows:

When the continuous combined curve $\Gamma_L$ is the combined curve $\Gamma_{L2}$ of the sine function curve and the tangent at the inflection point thereof, the continuous combined curve $\Gamma_{L2}$ is formed by a sine function curve $\Gamma_{L22}$ and a tangent $\Gamma_{L21}$ at an inflection point of the sine function curve; a rectangular coordinate system is established at the tangent point of the continuous combined curve, and an equation of the combined curve $\Gamma_{L2}$ of the sine function curve and the tangent at the inflection point thereof is as follows:

$$\begin{cases} \Gamma_{L21}: x_{20} = t, y_{20} = kt & (t_1 \le t < 0) \\ \Gamma_{L22}: x_{20} = t, y_{20} = A\sin(Bt) & (0 \le t \le t_2) \end{cases},$$

where $x_{20}$ and $y_{20}$ are x-axis and y-axis coordinate values of the combined curve in the rectangular coordinate system, respectively; a parameter t is an independent variable of the equation; $t_1$ and $t_2$ are value ranges of the continuous curve; k is a slope of the tangent at the inflection point of the sine function curve; and A and B are coefficients of the equation.

When the continuous combined curve $\Gamma_L$ is the combined curve $\Gamma_{L3}$ of the epicycloid function curve and the tangent at the inflection point thereof, the continuous combined curve $\Gamma_{L3}$ is formed by an epicycloid function curve $\Gamma_{L32}$ and a tangent $\Gamma_{L31}$ at an inflection point of the epicycloid function curve; a rectangular coordinate system is established at the tangent point of the continuous combined curve, and an equation of the combined curve $\Gamma_{L3}$ of the epicycloid function curve and the tangent at the inflection point thereof is as follows:

$$\begin{cases} \Gamma_{L31}: x_{30} = t, y_{30} = kt \quad (t_1 \le t < 0) \\ \Gamma_{L32}: \\ \quad x_{30} = (R+r)\sin t - e\sin((R+r)t/r) \quad (0 \le t < t_2) \\ \quad y_{30} = (R+r)\cos t - e\cos((R+r)t/r) - (R+r-e) \end{cases},$$

where $x_{30}$ and $y_{30}$ are x-axis and y-axis coordinate values of the combined curve in the rectangular coordinate system, respectively; a parameter t is an independent variable of the equation; $t_1$ and $t_2$ are value ranges of the continuous curve; k is a slope of the tangent at the inflection point of the epicycloid function curve; R and r are radii of a cycloidal moving circle and fixed circle, respectively; and e is an eccentric distance.

When the continuous combined curve $\Gamma_L$ is the combined curve $\Gamma_{L4}$ of the odd power function, the continuous combined curve $\Gamma_{L4}$ is formed by a first odd power function curve $\Gamma_{L41}$ and a second odd power function curve $\Gamma_{L42}$; a rectangular coordinate system is established at the inflection point of the continuous combined curve, and an equation of the combined curve $\Gamma_{L4}$ of the odd power function is as follows:

$$\begin{cases} \Gamma_{L41}: x_{40} = t, y_{40} = At^{2n1-1} & (t_1 \le t < 0) \\ \Gamma_{L42}: x_{40} = t, y_{40} = Bt^{2n2-1} & (0 \le t \le t_2) \end{cases},$$

where $x_{40}$ and $y_{40}$ are x-axis and y-axis coordinate values of the combined curve in the rectangular coordinate system, respectively; a parameter t is an independent variable of the equation; $t_1$ and $t_2$ are value ranges of the continuous curve; A and B are coefficients of the equation; and n1 and n2 are degrees of the independent variable and are positive integers.

When the continuous combined curve $\Gamma_L$ is the combined curve $\Gamma_{L5}$ of the sine function, the continuous combined curve $\Gamma_{L5}$ is formed by a first sine function curve $\Gamma_{L51}$ and a second sine function curve $\Gamma_{L52}$; a rectangular coordinate system is established at the inflection point of the continuous combined curve, and an equation of the combined curve $\Gamma_{L5}$ of the sine function is as follows:

$$\begin{cases} \Gamma_{L51}: x_{50} = t, y_{50} = A_1\sin(B_1 t) & (t_1 \le t < 0) \\ \Gamma_{L52}: x_{50} = t, y_{50} = A_2\sin(B_2 t) & (0 \le t \le t_2) \end{cases},$$

where $x_{50}$ and $y_{50}$ are x-axis and y-axis coordinate values of the combined curve in the rectangular coordinate system, respectively; a parameter t is an independent variable of the equation; $t_1$ and $t_2$ are value ranges of the continuous curve; and $A_1$, $B_1$, $A_2$ and $B_2$ are coefficients of the equation.

When the continuous combined curve $\Gamma_L$ is the combined curve $\Gamma_{L6}$ of the epicycloid function, the continuous combined curve $\Gamma_{L6}$ is formed by a first epicycloid function curve $\Gamma_{L61}$ and a second epicycloid function curve $\Gamma_{L62}$; a rectangular coordinate system is established at the inflection point of the continuous combined curve, and an equation of the combined curve $\Gamma_{L6}$ of the epicycloid function is as follows:

$$\begin{cases} \Gamma_{L61}: \\ \quad x_{60} = (R_1+r_1)\sin t + e\sin((R_1+r_1)t/r_1) \quad (t_1 \le t < 0) \\ \quad y_{60} = (R_1+r_1)\cos t + e\cos((R_1+r_1)t/r_1) + (R_1+r_1-e) \\ \Gamma_{L62}: \\ \quad x_{60} = (R_2+r_2)\sin t - e\sin((R_2+r_2)t/r_2) \quad (0 \le t < t_2) \\ \quad y_{60} = (R_2+r_2)\cos t - e\cos((R_2+r_2)t/r_2) - (R_2+r_2-e) \end{cases},$$

where $x_{60}$ and $y_{60}$ are x-axis and y-axis coordinate values of the combined curve in the rectangular coordinate system, respectively; a parameter t is an independent variable of the equation; $t_1$ and $t_2$ are value ranges of the continuous curve; $R_1$ and $r_1$ are radii of a first epicycloid moving circle and fixed circle, respectively, and $R_2$ and $r_2$ are radii of a second epicycloid moving circle and fixed circle, respectively; and e is an eccentric distance.

In the present disclosure, the inflection point or the tangent point of the continuous combined curve is as follows:

1 When the continuous combined curve is a combined curve of an odd power function, a combined curve of a sine function or a combined curve of an epicycloid function, a connection point of the continuous combined curve is an inflection point, that is, a concave-convex boundary point of the curve, a second derivative of the curve is zero at this point, and second order derivative signs near two sides of this point are opposite;

2 when the combined curve is a combined curve of an odd power function curve and a tangent at an inflection point thereof, a combined curve of a sine function curve and a tangent at an inflection point thereof, or a combined curve of an epicycloid and a tangent at an inflection point thereof, a connection point of the combined curve is an inflection point of the odd power function curve, the sine function curve or the epicycloid (meaning the same as 1), which is also a tangent point of the odd power function curve, the sine function curve or the epicycloid at the tangent.

Figure 5:
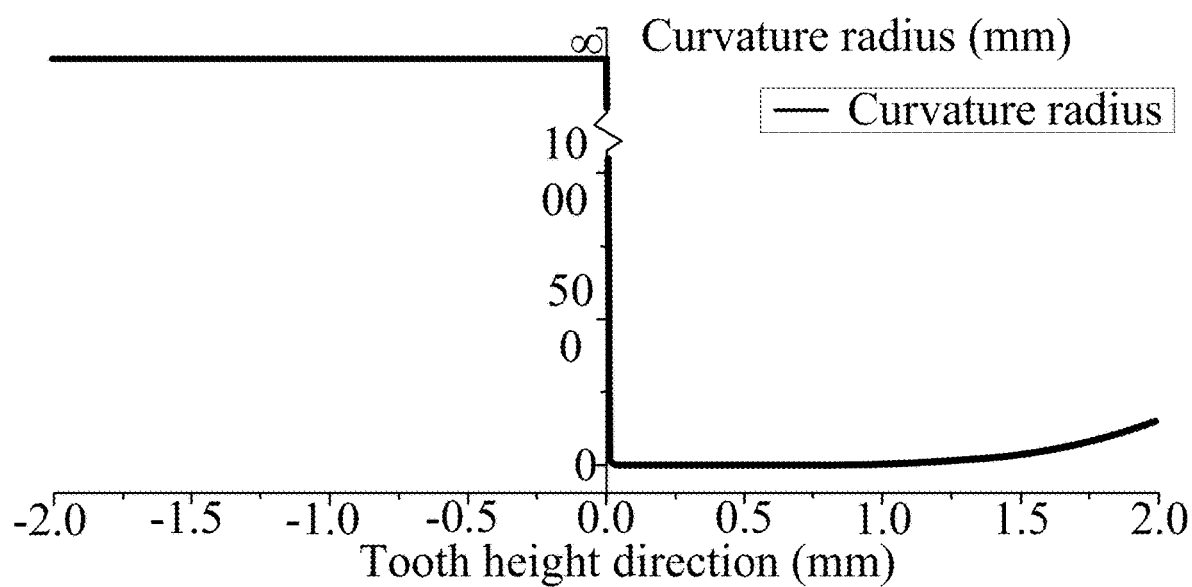
FIG. 5 is a schematic diagram illustrating a curvature radius at a meshing point of a gear pair of a herringbone planetary gear transmission device with a constant meshing characteristics constructed tooth pair having a combined curve of an odd power function curve and a tangent at an inflection point thereof as a tooth profile curve according to an embodiment of the present disclosure.

At the inflection point or the tangent point of the continuous combined curve, the curvature of the curve is zero, that is, the curvature radius tends to infinity. When the continuous combined curve is the combined curve of the odd power function, the combined curve of the sine function, or the combined curve of the epicycloid function, the curvature radii on two sides of the inflection point tend to infinity; or when the continuous combined curve is the combined curve of the odd power function curve and the tangent at the inflection point thereof, the combined curve of the sine function curve and the tangent at the inflection point thereof, or the combined curve of the epicycloid function curve and the tangent at the inflection point thereof, the curvature radius at the inflection point on the side of the odd power function curve, the sine function curve or the epicycloid function curve tends to infinity, and the curvature radius on the side of the tangent is infinite. The curvature radius of the combined curve is calculated based on given parameters in the embodiment, as shown in FIG. 5. The curvature radius of a straight line segment in the combined curve in FIG. 5 is infinite, the curvature radius at the inflection point tends to infinity, and the curvature radius of the cubic power function curve segment gradually decreases and then increases, but is still far less than the curvature radius at the inflection point. This means that the curvature radius at a contact point of the gear pair with a constructed tooth pair tends to infinity, which improves the bearing capacity of the gear pair with a constructed tooth pair.

Figure 6:
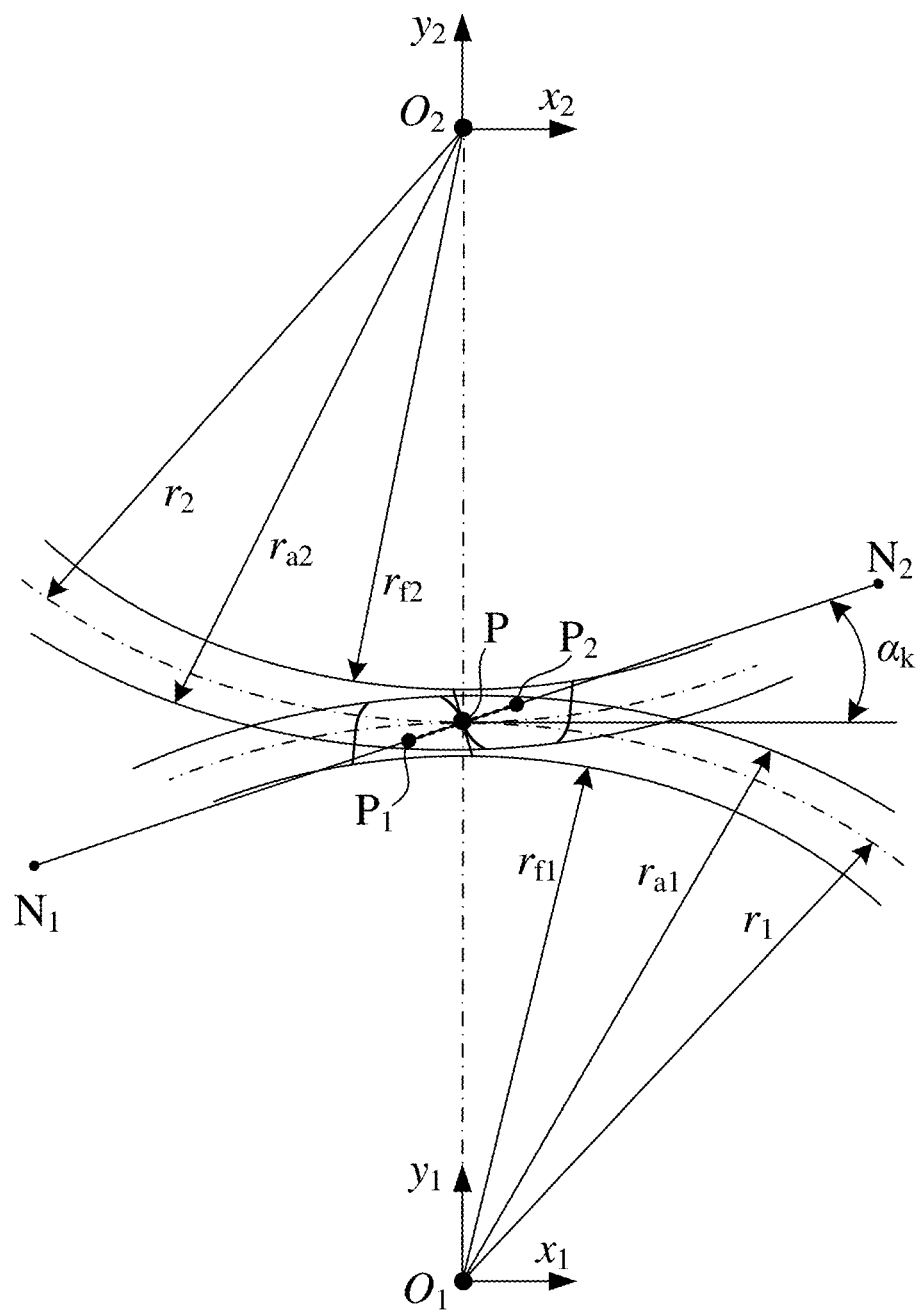
FIG. 6 is a schematic diagram of a designated point on a meshing force action line of a gear pair of a herringbone planetary gear transmission device with a constant meshing characteristics constructed tooth pair according to an embodiment of the present disclosure.

In the embodiment of the present disclosure, the inflection point or the tangent point of the continuous combined curve is a designated point located on a meshing force action line of the gear pair. The designated point is specifically defined as a given point at a pitch point or near the pitch point on the meshing force action line of the gear pair with a constructed tooth pair that is a straight line which forms a certain angle (pressure angle) with a horizontal axis by means of the pitch point. FIG. 6 is a schematic diagram of a designated point on a meshing force action line of a gear pair. In the figure, P is the designated point on the meshing force action line of the gear pair; $P_1$ and $P_2$ are limit points of the position range of the designated point; a straight line $N_1N_2$ is the meshing force action line of the gear pair; ax is a pressure angle; $O_1$ and $O_2$ are central points of the sun gear 1 with a constructed tooth pair and the planetary gear 2 with a constructed tooth pair, respectively; and $r_1$ and $r_2$, $r_{a1}$ and $r_{a2}$, and $r_{f1}$ and $r_{f2}$ are pitch radii, addendum circle radii, and dedendum circle radii of the sun gear 1 with a constructed tooth pair and the planetary gear 2 with a constructed tooth pair, respectively. The designated point P is a given point usually located at a pitch point or near either of two sides of the pitch point, and a variation area of the designated point does not exceed a half of a tooth height.

Figure 7:
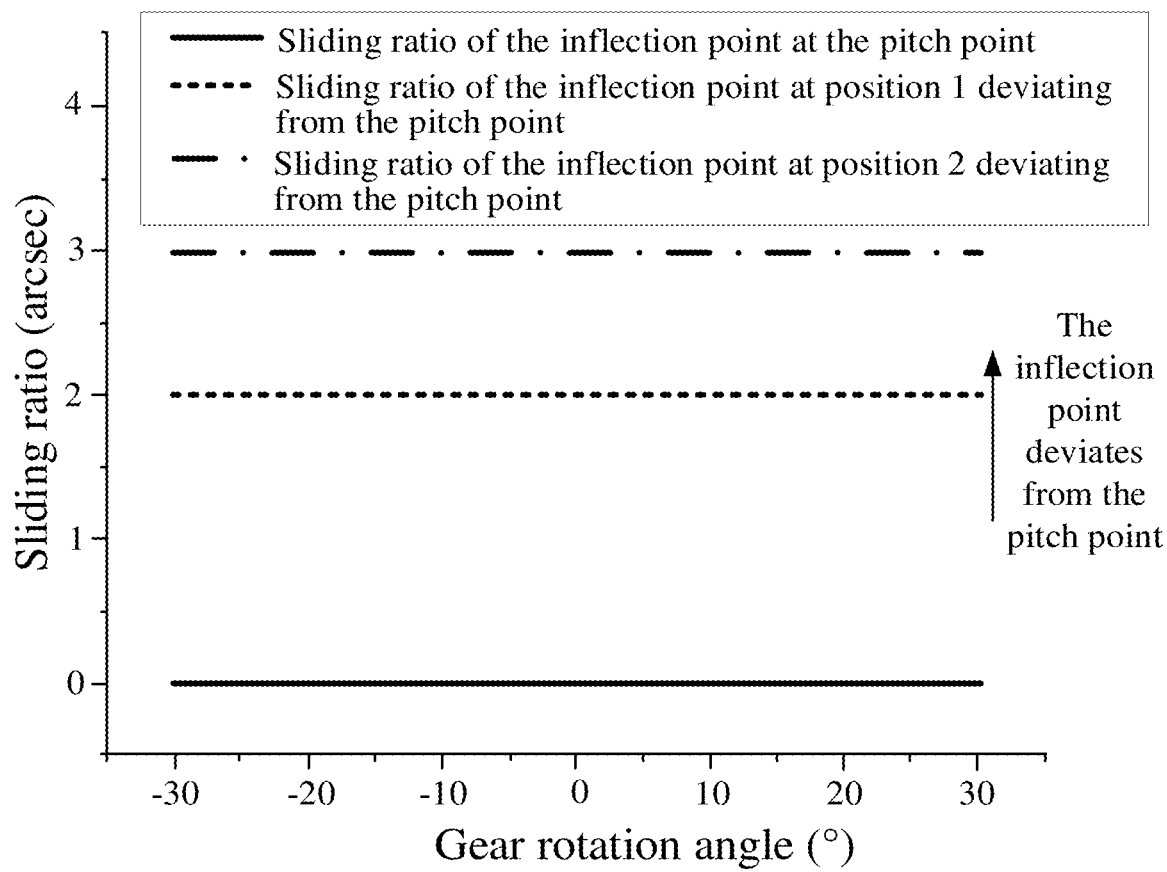
FIG. 7 is a schematic diagram illustrating a sliding ratio at a meshing point of a gear pair of a herringbone planetary gear transmission device with a constant meshing characteristics constructed tooth pair having a combined curve of an odd power function curve and a tangent at an inflection point thereof as a tooth profile curve according to an embodiment of the present disclosure.

According to the principle of gear meshing, it can be known that there is no relative sliding between tooth surfaces when the gear pair with a constructed tooth pair meshes at the pitch point. FIG. 7 is a schematic diagram illustrating a sliding ratio at a meshing point of a gear pair of a herringbone planetary gear transmission device with a constant meshing characteristics constructed tooth pair having a combined curve of an odd power function curve and a tangent at an inflection point thereof as a tooth profile curve according to an embodiment of the present disclosure. Since the gear pair of the herringbone planetary gear transmission device with a constant meshing characteristics constructed tooth pair having the same tooth profile of continuous combined curves meshes at a pitch point at any time in the embodiment, the gear pair with a constructed tooth pair can achieve zero-sliding meshing. When the inflection point or the tangent point of the combined curve does not coincide with the pitch point, the sliding ratio of the gear pair with a constructed tooth pair is also constant but is not zero. A closer inflection point or tangent point of the continuous curve to the pitch point indicates a smaller sliding ratio of the gear pair with a constructed tooth pair, vice versa. When the inflection point or the tangent point coincides with the pitch point, the gear pair with a constructed tooth pair can achieve zero-sliding meshing transmission, which reduces the wear between tooth surfaces and improves the transmission efficiency of the gear pair with a constructed tooth pair.

Further, when the gear pair with a constructed tooth pair having the same tooth profile of the continuous combined curves has a contact ratio designed as an integer, the meshing stiffness of the gear pair with a constructed tooth pair is a constant, and at this time, a meshing force of the gear pair with a constructed tooth pair at any meshing position is determined. Therefore, when the contact ratio is designed as an integer, the gear pair with a constructed tooth pair having the same tooth profile of the continuous combined curves has a constant meshing state at any time, which effectively ensures stability of dynamic meshing performance of the gear pair with a constructed tooth pair and can effectively reduce vibration noise of the gear pair with a constructed tooth pair.

Figure 8:
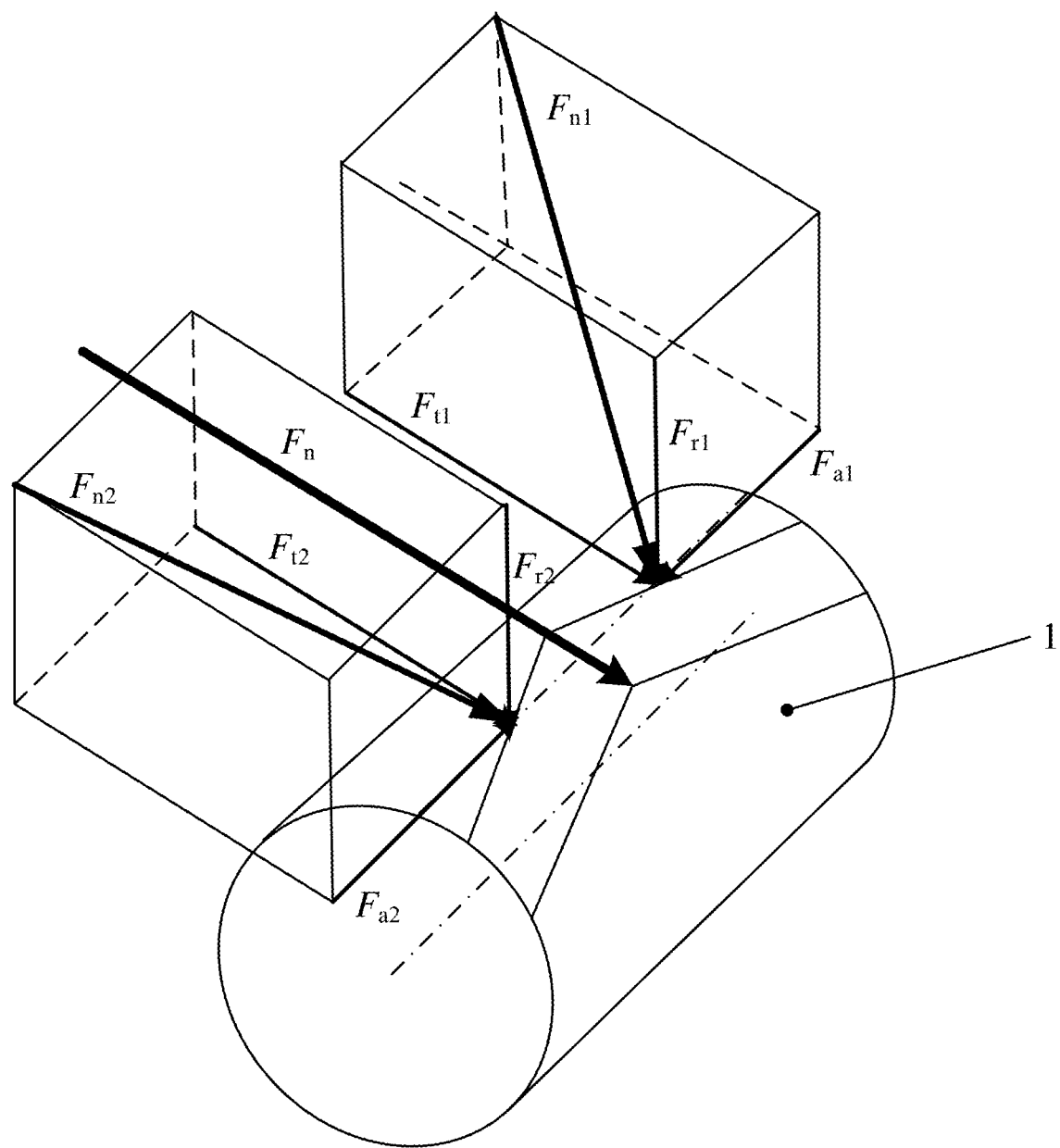
FIG. 8 is a schematic diagram illustrating a meshing force of a gear pair of a herringbone planetary gear transmission device with a constant meshing characteristics constructed tooth pair according to an embodiment of the present disclosure.

A schematic diagram illustrating a meshing force of a meshing gear pair is established with the herringbone planetary gear transmission device with a constant meshing characteristics constructed tooth pair as an example, as shown in FIG. 8. For a right side of the herringbone meshing gear pair with a constructed tooth pair, a meshing force $F_{n1}$ during meshing of the gear pair may be decomposed into an axial force $F_{a1}$, a radial force $F_{r1}$, and a circumferential force $F_{t1}$. For a left side of the herringbone gear pair with a constructed tooth pair, a meshing force $F_{n2}$ during gear meshing may be decomposed into an axial force $F_{a2}$, a radial force $F_{r2}$, and a circumferential force $F_{t2}$. When only the right side of the gear pair is considered, during meshing, with the movement of the meshing point in a tooth width direction, the meshing force $F_{n1}$ of the gear pair also translates in the tooth width direction, and a change in stress state leads to a periodic change in excitation factors of the gear pair, which seriously affects dynamic meshing performance of the gear pair. When the two sides of the herringbone gear pair with a constructed tooth pair are both considered, since left and right side teeth are completely symmetrical, the axial forces $F_{a1}$ and $F_{a2}$ on tooth surfaces of the two sides cancel out each other, the radial forces $F_{r1}$ and $F_{r2}$ on the two sides are simplified to a central position of the herringbone gear pair with a constructed tooth pair in the tooth width direction, and the circumferential forces $F_{t1}$ and $F_{t2}$ on the two sides are also simplified to the central position of the herringbone gear pair with a constructed tooth pair in the tooth width direction. Therefore, a position and a direction of an action line of a combined force $F_n$ of the meshing forces $F_{n1}$ and $F_{n2}$ of the herringbone meshing gear pair with a constructed tooth pair are determined at any time, which improves stability of the herringbone meshing gear pair with a constructed tooth pair during meshing.

Finally, it should be noted that the above embodiments are only intended to explain, rather than to limit the technical solutions of the present disclosure. Although the present disclosure is described in detail with reference to the preferred embodiments, those of ordinary skill in the art should understand that modifications or equivalent substitutions may be made to the technical solutions of the present disclosure without departing from the purpose and scope of the technical solutions of the present disclosure, and such modifications or equivalent substitutions should fall within the scope of the claims of the present disclosure.

What is claimed is:

1. A herringbone planetary gear transmission device with a constant meshing characteristics constructed tooth pair, comprising a sun gear (1) with a constructed tooth pair, a planetary gear (2) with a constructed tooth pair and an internal gear (3) with a constructed tooth pair based on conjugate curves, wherein a normal tooth profile curve $\Gamma_{s1}$ of the sun gear (1) with a constructed tooth pair, a normal tooth profile curve $\Gamma_{s2}$ of the planetary gear (2) with a constructed tooth pair and a normal tooth profile curve $\Gamma_{s3}$ of the internal gear (3) with a constructed tooth pair are continuous combined curves $\Gamma_L$ with the same curve shape, and the continuous combined curves $\Gamma_L$ comprise a combined curve ILI of an odd power function curve and a tangent at an inflection point thereof; the continuous combined curve is formed by two continuous curves, a connection point of the two continuous curves is an inflection point or a tangent point of the continuous combined curve, and the inflection point or the tangent point of the continuous combined curve is a designated point located on a meshing force action line of a gear pair; and normal tooth profiles are swept along given conjugate curves to obtain tooth surfaces of the sun gear (1) with a constructed tooth pair, the planetary gear (2) with a constructed tooth pair and the internal gear (3) with a constructed tooth pair;

wherein when the continuous combined curve $\Gamma_L$ is the combined curve $\Gamma_{L1}$ of the odd power function curve and the tangent at the inflection point thereof, the continuous combined curve IL is formed by an odd power function curve $\Gamma_{L12}$ and a tangent $\Gamma_{L11}$ at an inflection point of the odd power function curve; a rectangular coordinate system is established at the tangent point of the continuous combined curve, and an equation of the combined curve ILI of the odd power function curve and the tangent at the inflection point thereof is as follows:

$$\begin{cases} \Gamma_{L11}: x_{10} = t, y_{10} = 0 \ (t_1 \le t < 0) \\ \Gamma_{L12}: x_{10} = t, y_{10} = At^{2n-1} \ (0 \le t \le t_2) \end{cases},$$

wherein $x_{10}$ and $y_{10}$ are x-axis and y-axis coordinate values of the combined curve in the rectangular coordinate system, respectively; a parameter t is an independent variable of the equation; $t_1$ and $t_2$ are value ranges of the continuous curve; A is a coefficient of the equation; and n is a degree of the independent variable and is a positive integer.

2. The herringbone planetary gear transmission device with a constant meshing characteristics constructed tooth pair according to claim 1, wherein a curve equation of the normal tooth profile curve $\Gamma_{s1}$ of the sun gear (1) with a constructed tooth pair obtained by rotating the continuous combined curve $\Gamma_L$ around an origin of the rectangular coordinate system by an angle $\alpha_1$ is as follows:

$$\begin{cases} x_{01} = x_{n0}\cos\alpha_1 - y_{n0}\sin\alpha_1 \\ y_{01} = x_{n0}\sin\alpha_1 + y_{n0}\cos\alpha_1 \end{cases} (n = 1, 2, 3, 4, 5, 6),$$

wherein $x_{01}$ and $y_{01}$ are x-axis and y-axis coordinate values of the normal tooth profile curve of the sun gear (1) with a constructed tooth pair in the rectangular coordinate system, respectively.

3. The herringbone planetary gear transmission device with a constant meshing characteristics constructed tooth pair according to claim 2, wherein a curve equation of the normal tooth profile curve $\Gamma_{s2}$ of the planetary gear (2) with a constructed tooth pair obtained by rotating the normal tooth profile curve $\Gamma_{s1}$ of the sun gear (1) with a constructed tooth pair around the origin of the rectangular coordinate system by an angle of 180° is as follows:

$$\begin{cases} x_{02} = x_{01}\cos(180°) - y_{01}\sin(180°) \\ y_{02} = x_{01}\sin(180°) + y_{01}\cos(180°) \end{cases},$$

wherein $x_{02}$ and $y_{02}$ are x-axis and y-axis coordinate values of the normal tooth profile curve of the planetary gear (2) with a constructed tooth pair in the rectangular coordinate system, respectively.

4. The herringbone planetary gear transmission device with a constant meshing characteristics constructed tooth pair according to claim 3, wherein a curve equation of the normal tooth profile curve $\Gamma_{s3}$ of the internal gear (3) with a constructed tooth pair obtained by rotating the normal tooth profile curve $\Gamma_{s2}$ of the planetary gear (2) with a constructed tooth pair around the origin of the rectangular coordinate system by an angle of 180° is as follows:

$$\begin{cases} x_{03} = x_{02}\cos(180°) - y_{02}\sin(180°) \\ y_{03} = x_{02}\sin(180°) + y_{02}\cos(180°) \end{cases},$$

wherein $x_{03}$ and $y_{03}$ are x-axis and y-axis coordinate values of the normal tooth profile curve of the internal gear (3) with a constructed tooth pair in the rectangular coordinate system, respectively.

5. The herringbone planetary gear transmission device with a constant meshing characteristics constructed tooth pair according to claim 2, wherein a tooth surface $\Sigma_1$ of the sun gear (1) with a constructed tooth pair is obtained by sweeping the normal tooth profile curve $\Gamma_{s1}$ of the sun gear (1) with a constructed tooth pair along a given helix, with a tooth surface equation as follows:

$$\begin{cases} x_{\Sigma 1} = x_{01}\cos\theta - y_{01}\cos\beta\sin\theta + r_1\cos\theta \\ y_{\Sigma 1} = x_{01}\sin\theta + y_{01}\cos\beta\cos\theta + r_1\sin\theta \\ z_{\Sigma 1} = \pm(r_1\theta\cot\beta - y_{01}\sin\beta) \end{cases},$$

wherein in the sign "+", the sign "+" indicates a left tooth surface, and the sign "−" indicates a right tooth surface; $x_{\Sigma 1}$, $y_{\Sigma 1}$ and $z_{\Sigma 1}$ are coordinate values of the tooth surface of the sun gear (1) with a constructed tooth pair, respectively; $\beta$ is a helix angle of the gear pair, $\theta$ is an angle of a given contact line, and $r_1$ is a pitch radius of the sun gear (1) with a constructed tooth pair.

6. The herringbone planetary gear transmission device with a constant meshing characteristics constructed tooth pair according to claim 3, wherein a tooth surface $\Sigma_2$ of the planetary gear (2) with a constructed tooth pair is obtained by sweeping the normal tooth profile curve $\Gamma_{s2}$ of the planetary gear (2) with a constructed tooth pair along a given helix, with a tooth surface equation as follows:

$$\begin{cases} x_{\Sigma 2} = x_{02}\cos\theta - y_{02}\cos\beta\sin\theta + r_2\cos\theta \\ y_{\Sigma 2} = x_{02}\sin\theta + y_{02}\cos\beta\cos\theta + r_2\sin\theta \\ z_{\Sigma 2} = \pm(r_2\theta\cot\beta - y_{02}\sin\beta) \end{cases},$$

wherein in the sign "+", the sign "+" indicates a left tooth surface, and the sign "−" indicates a right tooth surface; $x_{\Sigma 2}$, $y_{\Sigma 2}$ and $z_{\Sigma 2}$ are coordinate values of the tooth surface of the planetary gear (2) with a constructed tooth pair, respectively; $\beta$ is a helix angle of the gear pair, θ is an angle of a given contact line, and $r_2$ is a pitch radius of the planetary gear (2) with a constructed tooth pair.

7. The herringbone planetary gear transmission device with a constant meshing characteristics constructed tooth pair according to claim 4, wherein a tooth surface $\Sigma_3$ of the internal gear with a constructed tooth pair is obtained by sweeping the normal tooth profile curve $\Gamma_{s3}$ of the internal gear (3) with a constructed tooth pair along a given helix, with a tooth surface equation as follows:

$$\begin{cases} x_{\Sigma 3} = x_{03}\cos\theta - y_{03}\cos\beta\sin\theta + r_3\cos\theta \\ y_{\Sigma 3} = x_{03}\sin\theta + y_{03}\cos\beta\cos\theta + r_3\sin\theta, \\ z_{\Sigma 3} = \pm(r_3\theta\cot\beta - y_{03}\sin\beta) \end{cases}$$

wherein in the sign "±", the sign "+" indicates a left tooth surface, and the sign "−" indicates a right tooth surface; $x_{\Sigma 3}$, $y_{\Sigma 3}$ and $z_{\Sigma 3}$ are coordinate values of the tooth surface of the internal gear (3) with a constructed tooth pair, respectively; β is a helix angle of the gear pair, θ is an angle of a given contact line, and $r_3$ is a pitch radius of the internal gear (3) with a constructed tooth pair.

8. The herringbone planetary gear transmission device with a constant meshing characteristics constructed tooth pair according to claim 1, wherein a contact ratio of a meshing gear pair with a constructed tooth pair is designed as an integer, thereby achieving meshing transmission with a constant stiffness.

9. The herringbone planetary gear transmission device with a constant meshing characteristics constructed tooth pair according to claim 1, wherein the sun gear (1) with a constructed tooth pair, the planetary gear (2) with a constructed tooth pair and the internal gear (3) with a constructed tooth pair each are in the form of a herringbone gear, thereby achieving a constant meshing force action line.

* * * * *